June 22, 1965 I. PELECH ETAL 3,191,179

DATA PROCESSING

Filed April 12, 1961

INVENTORS
Roger K. Lee Jr.
BY Ivan Pelech

Philip J. McFarland
ATTORNEY 3,191,179
DATA PROCESSING

Ivan Pelech and Roger Kenneth Lee, Jr., Watertown, Mass., assignors to Laboratory for Electronics, Inc., Boston, Mass., a corporation of Delaware Filed Apr. 12, 1961, Ser. No. 102,506
3 Claims. (Cl. 346—74)

This invention pertains generally to magnetic recording apparatus and particularly to magnetic recording apparatus utilizing a flexible disc as a storage medium.

In the prior art, magnetic recorders using thin flexible magnetic discs have been found to be particularly advantageous when it is desired to store high frequency or wide band signals. In certain ones of such known devices, the magnetic disc is mounted adjacent to an apertured plate and then spun rapidly. Air, or any other incompressible fluid, is introduced into the space between the disc and the plate through the apertured plate and moved through that space, being expelled therefrom at the periphery of the disc. The pressure of the air moving through the space between the disc and the plate is lowered, thus forcing the disc to rotate close to, but not in contact with, the plate. If proper precautions are taken, the spacing between the disc and each one of a number of magnetic transducers mounted on the plate may be adjusted so as to accomplish the desired recording.

While recorders of the type just referred to have proven their worth in many applications, difficulties have been encountered which sometimes limit their value. Thus, experience has proven that relative large amounts of power are required to propel any incompressible liquid through the space between the disc and the plate when the spacing between those two parts is small, say less than one mil. This difficulty is especially apparent when it is desired to rotate the disc at high speeds and/or use a disc of large diameter. Even if sufficient power is provided to force a sufficient amount of the incompressible fluid through the space between the disc and the plate, satisfactory control of the fluid is accomplished only if relatively complicated and sophisticated pneumatic control means are utilized to maintain a predetermined balance between the pressure, temperature and velocity of the fluid in the space between the disc and the plate. In addition, of course, the use of a fluid implies that a supply of fluid be provided to operate the device. In other words, prior art flexible disc recorders are not adapted for use in a high vacuum. The fact that prior art flexible disc recorders must be operated in a fluid also restricts the maximum speed at which the flexible disc may be operated. In practice, it has been found that when a flexible disc is rotated in a fluid the effect of almost indiscernible irregularities, especially tiny burrs, on the periphery of the disc, cause instability.

Therefore, it is the object of this invention to provide a flexible disc magnetic recorder in which an electrostatic force is created to determine the spacing of a magnetic disc from a magnetic transducer.

Another object of the invention is to provide a magnetic recorder using a flexible disc in which relatively small amounts of power are required for operation.

Still another object of the invention is to provide a magnetic recorder using a flexible disc which is stable at extremely high rotational speeds.

These, and other objects of the invention, are obtained generally by providing an electrically conductive flexible disc, the disc having at least one magnetizable surface, means for rotating the disc, a stabilizing plate adjacent to and substantially parallel to the disc when the disc is rotated, a plurality of magnetic transducers supported by the stabilizing plate, and means for creating an electric field between the stabilizing plate and the disc, which in combination with the internal stresses and bending moments set up in the disc by rotation thereof, fixes the position of the disc with respect to the stabilizing plate and the magnetic transducers mounted thereon.

Other features of the invention will become evident from the following description of a specific embodiment of the invention, taken together with the drawings in which:

FIG. 1 is a cross sectional view of a magnetic recorder according to the invention.

FIG. 1*a* is a cross sectional view of the flexible disc according to the invention.

Before going on to a detailed description of various figures it will be noted that the various embodiments of the invention may utilize a flow of a fluid between the recording disc and the stabilizing plate. It should be recognized, however, that such a fluid is not essential to the proper operation of invention. Further, it should be noted that details in the various figures have been distorated in some respects, the better to illustrate the invention. For example, the spacing between the magnetic disc and the stabilizing plate has been greatly magnified, it being intended that in a practical device the spacing between the magnetic disc and the stabilizing plate be in the order of one mil or less.

Figure 1:
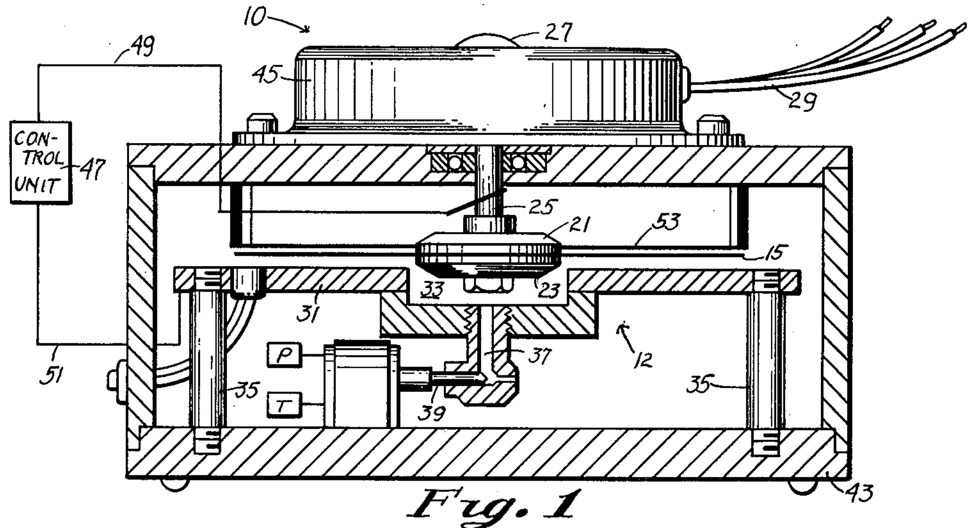
Figures 1A, 3, 4:
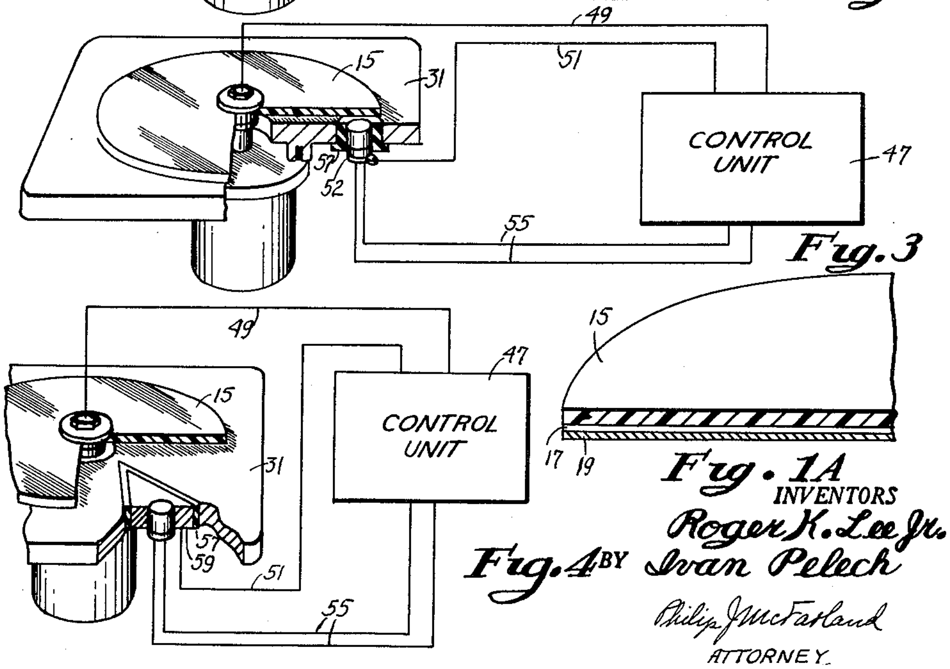
FIG. 3 is a perspective view, partially cut away, of a magnetic recorder according to a second embodiment of the invention.
FIG. 4 is a perspective view partially cut away of a magnetic recorder according to a third embodiment of the invention.

Turning now to FIGS. 1 and 1*a*, it may be seen that the invention comprises a magnetic disc and drive assembly 10 positioned in operative relationship to a stabilizing plate and magnetic head assembly 12, the assemblies being so positioned with respect to each other that an electric field may be created between the two. The magnetic disc and drive assembly 10 includes a flexible disc 15, preferably fabricated from a plastic sheet having a thickness in the order of .002″. Impregnated in or coated on at least one surface of the disc 15 is a magnetic recording material 17, as a ferrite. The disc 15 is also coated on at least one surface with an electrically conductive coating 19, as silver or gold. The disc 15 is centrally supported between a pair of opposing flanges 21, 23, the flanges in turn being mounted on a shaft 25 which simply is an extension of the rotor shaft of a synchronous motor 27. The motor 27 in turn is energized through leads 29 by a source of alternating current (not shown). It is obvious, therefore, that the disc 15 rotates at the speed of the synchronous motor 27, so that dynamic and elastic forces operating on the disc 15 will cause that element to rotate in a plane substantially perpendicular to the shaft 25, even though the disc 15 is incapable of supporting itself.

The stabilizing plate and magnetic head assembly 12 consists of a stabilizing plate 31 having a depression 33 formed centrally thereof to provide clearance for the flange 21 and to form a manifold directly beneath the flange 21. The stabilizing plate 31 is held in position by a plurality of posts 35 (only two of which are shown) which preferably are disposed at equal intervals adjacent the periphery of the stabilizing plate 31. A tube 37 running between an adjustable air inlet orifice valve 39 and the opening 33 allows a fluid, as air, to pass into the space between the disc 15 and the stabilizing plate 31 during operation. In passing, it should be noted that the adjustable air inlet orifice valve 39 preferably is controlled by a thermally sensitive device and a pressure sensitive device (neither of which is shown) in order that the fluid may be automatically regulated. It has been chosen not to illustrate either the thermally sensitive device or the pressure sensitive device since both of these devices are known to the art and are illustrated and explained in detail in the co-pending application of Robert T. Pearson et al., Serial No. 853,373, filed November 16, 1959, and now abandoned and assigned to the same assignee of this application. In any event, air admitted through the adjustable air inlet orifice valve 39 passes through the tube 37 into the depression 33 and thence through the channel (not numbered) defined by the stabilizing plate 31 and the disc 15, so as to assist in maintaining spacing between the disc 15 and the stabilizing plate 31 in a manner described in detail in the application just referred to. A magnetic recording head 41 (which may be of the type described in chapter 7 of Digital Computer Components and Circuits by R. K. Richards, published by Van Nostrand) is mounted in the stabilizing plate 31 as illustrated, preferably so as to be flush with the surface of the stabilizing plate 31 adjacent the disc 15. It will be obvious to persons having skill in the art that a plurality of such heads could be used without departing from the spirit of this invention. For example, a number of reading heads, a number of recording heads and a number of erasing heads could be mounted in the stabilizing plate 31.

The entire structure, exclusive of the drive motor which has its own encasing 45, is mounted in an enclosure 43 so as to isolate the structure from external influences. As it is desired to create an electric field between the magnetic disc 15 and the stabilizing plate and magnetic head assembly 12, a control unit 47 is provided with leads 49 and 51, lead 49 being attached to the magnetic disc 15 and drive shaft 25, lead 51 being attached to the stabilizing plate and magnetic head assembly 12. The control unit in its simplest form may be a battery with a preselected voltage. If it is desired to have the enclosure 43 act as a shield against undesirable fields, the leads 49 and 51, the magnetic disc 15 and drive shaft 25, and the stabilizing plate and magnetic head assembly 12 can be insulated from the enclosure 43 using standard techniques. If it is also desired to have the disc rotate in a vacuum, the shaft 25 may operate thru a rotary seal in enclosure 43 or the enclosure 45 may be attached to enclosure 43 by means of a vacuum flange; all joints and lead-throughs will of course be vacuum tight. A shroud 53 may be attached to the enclosure 43 to further restrain the motion of the flexible disc when not in operation; it should preferably be maintained at the same electric potential as the fleixble disc, as by a common connection to lead 49, and may be electrically insulated from enclosure 43.

Figure 2:
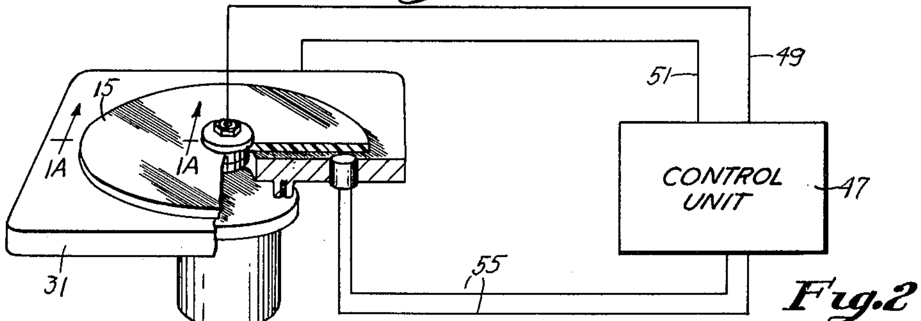
FIG. 2 is a perspective view, partially cut away, of a disc and a stabilizing plate illustrating a slight modification of the principle of operation of the device illustrated in FIG. 1.

In FIG. 2 the disc and stabilizing plate of FIG. 1 are shown in a perspective view, partially cut away, with the disc 15 being rotated by the synchronous motor 27. As in FIG. 1, the potential between the disc 15 and the stabilizing plate 31 is supplied by a control unit 47 with lead 49 connecting to the flange 23 (and thus to the disc) and lead 51 connecting to the stabilizing plate 31. There is a slight modification from the apparatus of FIG. 1 in that the potential applied to the disc and stabilizing plate by the control unit is regulated by the strength of the signal appearing in the recording head 41 and its leads 55. In general a weaker signal will cause a greater potential to appear resulting in a smaller disc-head separation if the disc and stabilizing plate are of opposite polarity.

In FIG. 3, the recording head 41 is electrically isolated from the stabilizing plate 31 by an insulating material 57; lead 51 is now connected to an electrically conductive sleeve 52 around the recording head 41, not to the stabilizing plate 31 in FIG. 2. The potential difference now exists between the disc 15 and the recording head and is controlled by the output signal of the recording head 41. The stabilizing plate is electrically "floating"; if it is desired it may be grounded or placed at any preselected potential above ground, establishing a desired value of separation at places other than the areas immediately surrounding the heads.

In FIG. 4, lead 51 is connected to a sector 59 of the stabilizing plate 31 which is insulated from the stabilizing plate by an insulating material 57. The remainder of the stabilizing plate may be placed at any preselected voltage above ground.

It is seen then that the separation between the flexible disc and the recording head and the stabilizing plate may be maintained and controlled by the application of a potential difference between the two. This potential difference can be controlled by the signal appearing from the recording head. As the device may now operate in a vacuum stability at high rotational speeds can be obtained with the requirement of a small amount of power for operation, especially when spacing between the disc and more than one recording head is controlled as described.

Having thus described the invention, it will be apparent that numerous modifications and departures may now be made by those skilled in the art, all of which fall within the scope contemplated by the invention. Consequently the invention herein described is to be construed to be limited only by the spirit and scope of the appended claims.

What is claimed is:

1. A magnetic recorder wherein a gap between a magnetic recording medium and each one of a plurality of magnetic transducers may be varied, comprising: a flexible magnetic recording disc having an electrically conductive surface, a plurality of magnetic transducers and an electrically conductive stabilizing plate mounted in a fluid; means for rotating the disc in proximity to the plate; means for mounting each one of the plurality of magnetic transducers flush with a surface of the plate; means for regulating the fluid pressure gradient radially of the disc; and means for establishing an electrostaic force between each one of the magnetic transducers and the electrically conductive surface of the disc, the last-named including means for applying electric potential to the electrically conductive surface of the disc and to the plate.

2. A magnetic recorder in which a gap between a magnetic recording medium and each one of a plurality of radially disposed magnetic transducers may be varied comprising a flexible magnetic recording disc having an electrically conductive surface, means for mounting the flexible magnetic recording disc in a gaseous atmosphere, the pressure of such atmosphere being substantially less than atmospheric pressure, a plurality of magnetic transducers, a stabilizing plate having an electrically conductive reference surface substantially coextensive with the electrically conductive surface of the flexible magnetic recording disc, each one of the plurality of magnetic transducers being mounted flush with the reference surface of the stabilizing plate, means for rotating the flexible magnetic recording disc adjacent to and spaced from each one of the plurality of magnetic transducers, and means for applying a first electric potential to the reference surface and a second electric potential to the electrically conductive surface of the flexible magnetic recording disc, to control the spacing between each one of the plurality of magnetic transducers and the flexible magnetic recording disc.

3. A magnetic recorder as in claim 2 wherein the electrically conductive reference surface of the stabilizing plate covers a sector of the stabilizing plate.

References Cited by the Examiner

UNITED STATES PATENTS

| | | | |
|---|---|---|---|
| 2,899,260 | 8/59 | Farrand et al. | 346—74 |
| 2,950,353 | 8/60 | Fomenko | 179—100.2 |

IRVING L. SRAGOW, *Primary Examiner.*

ELI J. SAX, *Examiner.*